Sept. 30, 1969     M. A. TROZZOLO     3,469,524
FRY PAN

Filed Feb. 6, 1968     2 Sheets-Sheet 1

Marion A. Trozzolo
INVENTOR.

Sept. 30, 1969    M. A. TROZZOLO    3,469,524
FRY PAN

Filed Feb. 6, 1968    2 Sheets-Sheet 2

Marion A. Trozzolo
INVENTOR.

BY *Clarence A. O'Brien*
and *Harvey B. Jackson*
Attorneys

United States Patent Office 3,469,524
Patented Sept. 30, 1969

3,469,524
FRY PAN
Marion A. Trozzolo, 502 Delaware St.,
Kansas City, Mo. 64105
Filed Feb. 6, 1968, Ser. No. 703,356
Int. Cl. A47j 37/10, 27/10
U.S. Cl. 99—425                                  9 Claims

ABSTRACT OF THE DISCLOSURE

The fry pan disclosed herein is characterized by a disk-like bottom having a flat underneath surface capable of being firmly seated atop an electric stove burner. The top surface provides a bed or platform for the foods to be cooked. This platform is marginally encompassed by inwardly tapering lugs or risers segmental in plan and divided by radial open end grease gravitating and draining grooves. This bottom is surrounded by an annular concavo-convex rim whose lower half defines a semi-circular grease collecting trough and whose upper half defines a turned-in anti-splattering guard or shield. The trough also provides a limit stop shoulder to assist in seating the bottom of the pan. Radial kerfs provide keeper seats when the pan is placed atop the radial bars of a gas burner grid.

---

This invention relates to a fry pan having a specially designed discoidal bottom featuring a planar underneath side and a top side with a central bed or platform with grooves and encircling lugs and wherein the bottom is encompassed by a relatively shallow bowl-like vessel defining a unique rim.

Briefly, the fry pan herein shown, described and claimed is characterized, broadly speaking, by a disk-like bottom embodying significant features and an integral surrounding concavo-convex rim which cooperates with the encompassed bottom and contributes to the predetermined purpose of the bottom. As to the bottom itself it has a flat underneath surface or side which lends itself to firmly supported use when seated atop an electric burner. That portion of the rim, more particularly the lower half portion is fashioned into a substantially semicircular grease trapping and collecting trough. To the ends desired the inner wall of the trough depends below the flat bottom and provides an encircling shoulder which assists in positioning and retaining the pan when in use. The underneath convex exterior side of the trough has circumferentially spaced radial open-ended kerfs which define keeper seats and which can be retentively located and safely held atop the bars of a gas burner grid. The upper half portion of the rim provides an overhanging lip which serves as an anti-splattering shield. The central top side of the bottom provides a bed or platform for the food to be cooked. The lug-like risers which encircle the bed are decreased and taper inwardly and are segmental in plan and are separated or divided by radial circumferentially spaced grease draining grooves which empty into the trough. Appropriate handle means is provided on diametrically opposite portions of the rim.

As will be evident the radial circumferentially spaced grooves function to cause accumulating grease to gravitate and drain away from the cooking surface or bed. These grooves slope at their outer ends and empty the grease into the receiver portion of the trough. The curvature, that is the concavo-convex cross-section, of the upstanding rim defines not only the desired grease trapping trough but the upstanding inner splattering shield. The trough cooperates in locating and retaining the pan on an electric burner and the keeper seats in the bottom of the trough accomplish the same result when the pan is seated atop the radial bars or members of a conventional type gas burner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
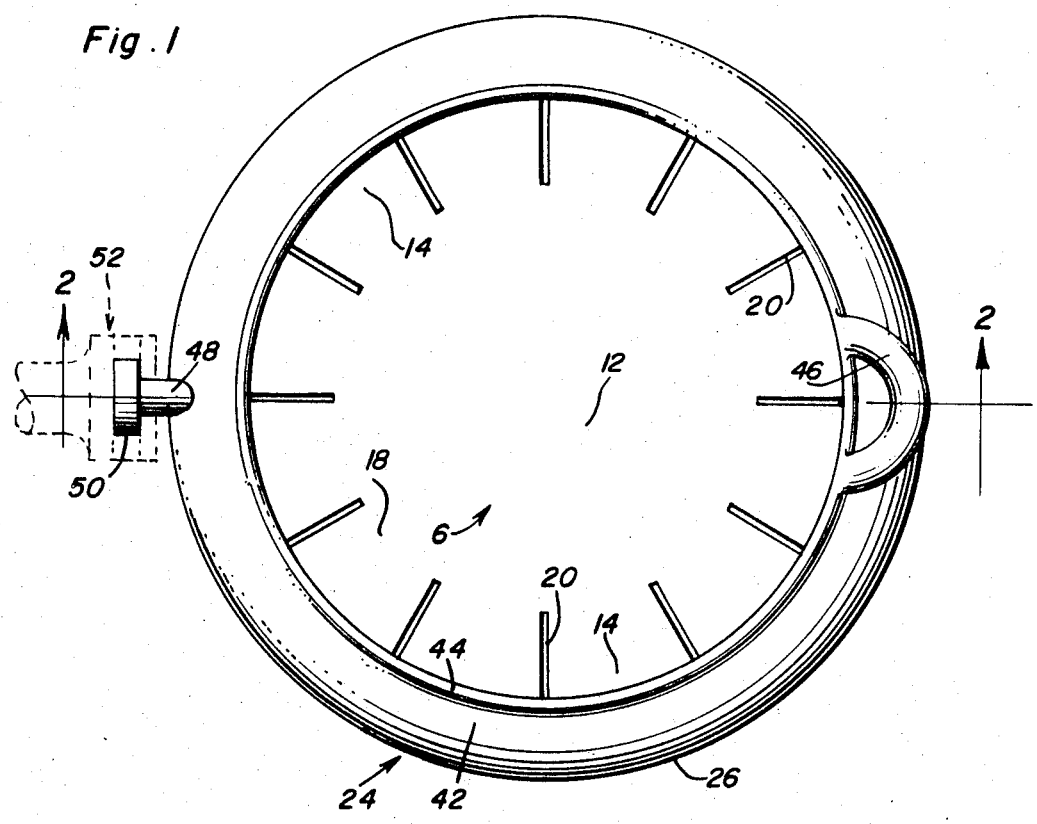
FIG. 1 is a top plan view of a frying pan constructed in accordance with the principles of the present invention and showing the handgrip at the right and the head tool accommodating or lifter handle stud at the left.

The aforementioned disk-like or discoidal bottom of the over-all pan is denoted, as an entity, by the numeral 6. The underneath surface or side 8 is smooth and flat and lends itself particularly well to use atop an electric stove burner of the type denoted generally at 10 in FIG. 2. The central portion of the top surface, denoted at 12 provides what is conveniently referred to here either as a bed or platform for the food which is to be cooked (not shown). The complete encircling marginal portion of this top surface is provided with tapered segmental lug-like risers 14. As shown in FIG. 1 these lugs or risers are not only generally segmental in shape and plan, they are spaced at equidistant points around the complete circumference of the bed or platform 12. It will be noted in particular in FIG. 2 that the outer marginal peripheral portions of the risers or lugs are increased in cross-sectional thickness as denoted generally at 16. The thickness decreases thus causing the inward ends of the lugs or risers to taper and merge smoothly into the bed as denoted at 18. The risers are separated by radial circumferentially spaced grease gravitating and drainage grooves or channels which are denoted at 20. As shown at the left and right in FIG. 2 the bottom of each groove slopes or slants outwardly as denoted at 22 to facilitate the efficient drainage result desired.

Figure 4:
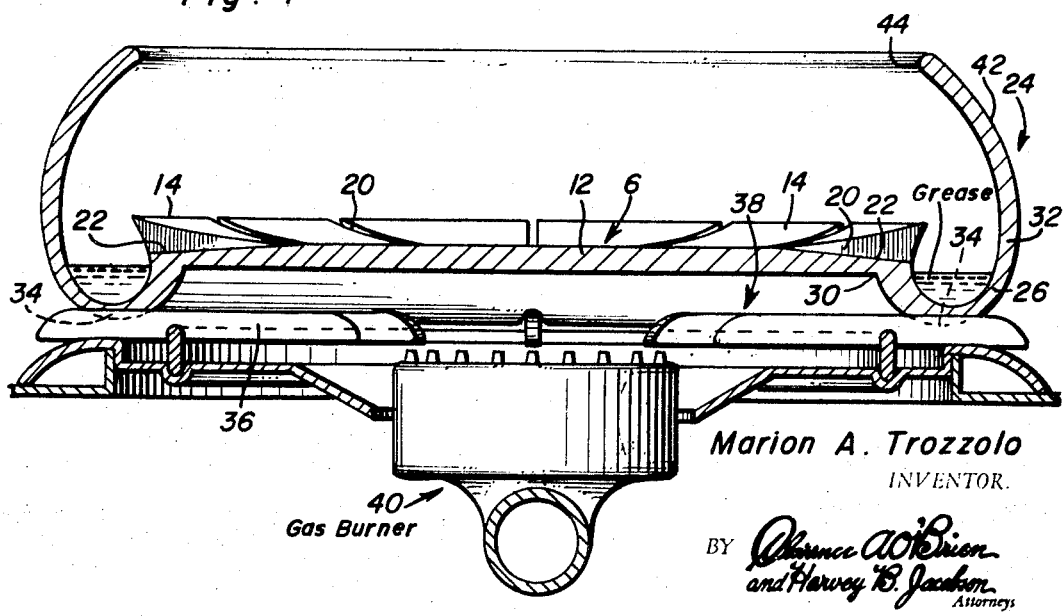
FIG. 4 is an enlarged sectional view taken approximately on the plane of the section line 4—4 of FIG. 3 and which also shows the pan seated atop the grid of a gas burner.

Taking up now the integral encompassing annular rim it will be noted that this is referred to, generally speaking, by the numeral 24. It is of concavo-convex cross-sectional design as clearly brought out in FIGS. 2 and 4. It can be referred to as broadly comprising an upper half portion and a lower half portion, the lower half portion being denoted at 26 and being substantially semi-circular in cross-section and defining an endless trough 28 for collecting the grease which is emptied into the same by way of the aforementioned grease gravitating grooves 20. The inward wall of this trough which is denoted at 30 provides a limit stop or shoulder which encircles the perimeter of the burner 10 and thus effects firm seating and retention of the pan on the burner when in use. The exterior convex bottom part of the trough, that is the part denoted at 32 is provided with open-ended circumferentially spaced radial grooves or kerfs 34 which are referred to more specifically as keeper seats and which lend themselves to retentive use atop the radial bars 36 of the grid 38 (FIG. 4) of the gas burner 40.

It will be further noted that the depth and curvature of the rim and particularly the upper half portion 42 provides an arrangement wherein the rounded lip portion 44 overhangs the grease trough and also the outer ends of the risers or lugs and being thus toed in, provides an effective anti-splattering shield or guard. It is within the purview of the invention to provide an integral substantially U-shaped handgrip 46 on one side of the rim substantially flush with the lip portion and which is accessible to be caught hold of with the fingers of the hand when the pan is cold or with an implement or tool if the pan is hot. On a diametrically opposite side a stud 48 is provided as shown in FIG. 1 and this stud has a terminal head 50. This headed stud can also be used in any manner desired as a further handgrip and also as an adapter for attachable and detachable implement or tool 52 such as shown in phantom lines.

Figure 2:
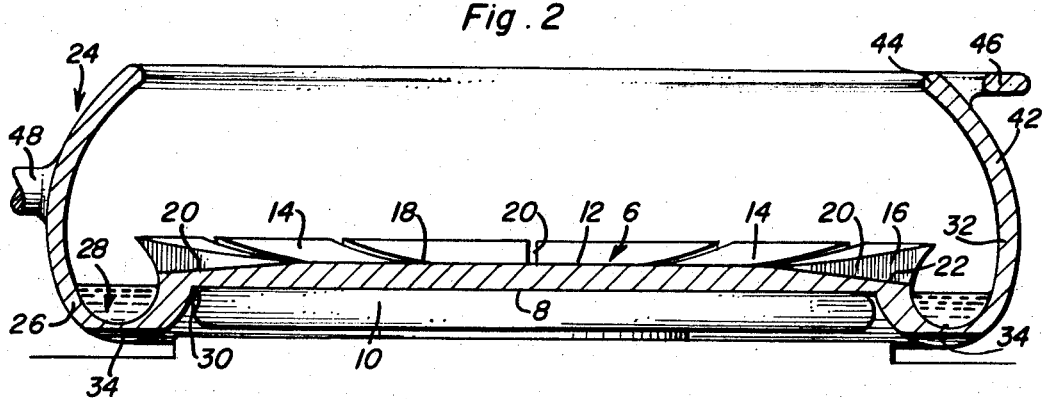
FIG. 2 is a cross-section on an enlarged scale taken approximately on the plane of the section line 2—2 of FIG. 1.
Figure 3:
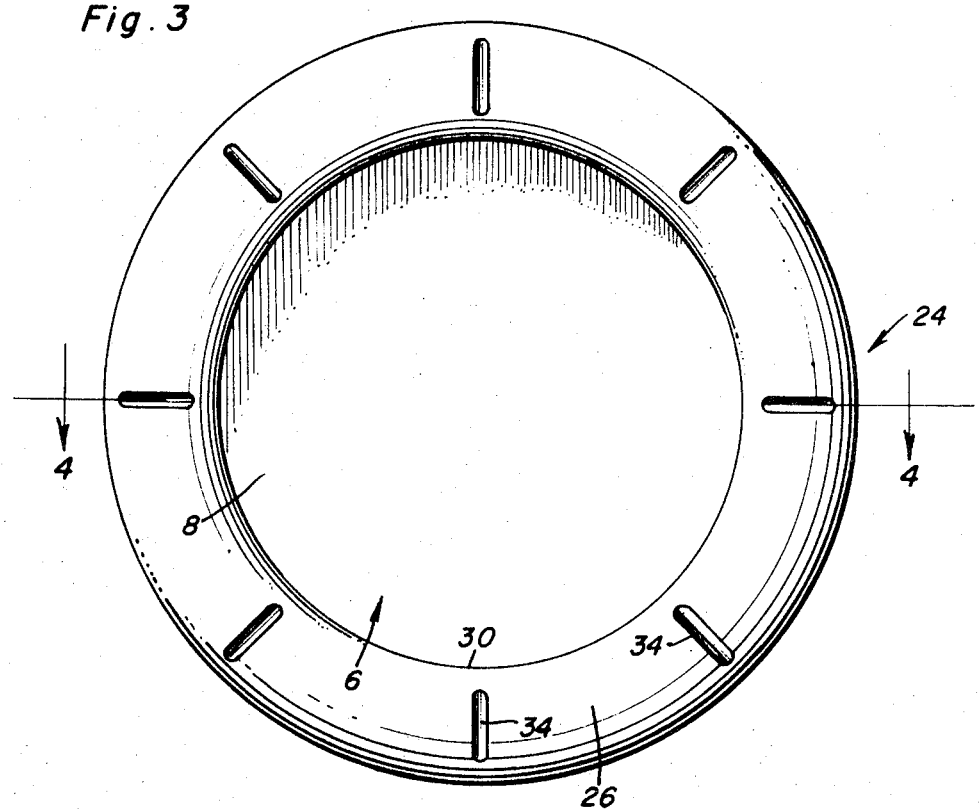
FIG. 3 is a bottom plan view of the complete ready-to-use fry pan.

It will be evident from the views of the drawing that this fry pan is an innovation in that it lends itself to firm and reliable use atop an electric burner when used in the manner illustrated in FIG. 2. It is equally adapted for use atop the grid of a gas burner in the manner illustrated in FIG. 4. Thus, the featured stop shoulder 30 and the depending trough 32 with its keeper seats 34 constitute significant achievements in the art of fry pans. Then too, the inwardly tapering circumferentially spaced risers 14 and intervening drainage grooves 20 contribute their proportionate share in the capability of the top or bed surface 12, best shown for example in FIG. 2. It will be evident therefore that the pan constructed in accordance with the principles of this invention well serves the purposes for which it has been perfected for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A frying pan comprising a hollow relatively shallow vessel embodying a bottom having a flat underneath surface designed and adapted to reside firmly for support atop an underlying electric burner and a top surface having a flat central bed portion marginally encompassed by circumferentially spaced segmental lugs separated by radial grooves, said grooves being open ended and providing grease gravitating and draining channels, said bottom being surrounded by an annular rim, said rim being concavo-convex in cross-section and characterized by a base portion below the plane of said underneath surface and defining a grease trapping and collecting trough, an upper inwardly curved lip portion overhanging the trough and providing an anti-splash shield, and an arcuately curved median portion between and joining said trough and lip portion.

2. The frying pan defined in and according to claim 1, and wherein said rim is exteriorly provided with handling means embodying components which are diametrically opposite each other.

3. The frying pan defined in and according to claim 1, and wherein said bottom is discoidal in plan, said lugs being gradually decreased in cross-sectional thickness and tapering inwardly toward and merging with said flat central bed portion and said grooves being progressively increased in depth and sloping toward the surrounding trough to facilitate the gravitation of accumulating grease into said trough.

4. The frying pan defined in and according to claim 3, and wherein said lip portion is toed-in to a locale spaced above and over hanging the outer peripheral end portions of said lugs.

5. The frying pan defined in and according to claim 1, and wherein said trough-forming base portion is substantially semi-circular in transverse section and provides an inward wall portion which is united to the flat underneath surface of said bottom in a manner to provide an endless stop shoulder which encircles the margin of said burner and, in so doing, minimizes the likelihood of accidental displacement once the pan is properly seated on said burner.

6. The frying pan defined in and according to claim 5, and wherein the exterior surface of the bottom of said trough is provided with open ended radial circumferentially spaced kerfs defining keeper seats and designed and adapted to retentively receive the usual radial bars of a commonly used gas burner grid.

7. The frying pan defined in and according to claim 6, and wherein said bottom is discoidal in plan, said lugs being gradually decreased in cross-sectional thickness and tapering inwardly toward and merging with said flat central bed portion and said grooves being progressively increased in depth and sloping toward the surrounding trough to facilitate the gravitation of accumulating grease into said trough, and wherein said lip is toed-in to a locale spaced above and overhanging the outer peripheral end portions of said lugs.

8. The frying pan defined in and according to claim 5, and wherein said bottom is discoidal in plan, said lugs being gradually decreased in cross-sectional thickness and tapering inwardly toward and merging with said flat central bed portion and said grooves being progressively increased in depth and sloping toward the surrounding trough to facilitate the gravitation of accumulating grease into said trough.

9. The frying pan defined in and according to claim 1, and wherein said rim is exteriorly provided wtih handling means embodying components which are diametrically opposite each other, said handling means comprising a U-shaped hand-grip on one side of the rim level with said lip portion, and a headed shank providing a tool grip.

References Cited

UNITED STATES PATENTS 1,733,450  10/1929  Detwiler _____ 126—390 XR

WALTER A. SCHEEL, Primary Examiner

JOHN M. BELL, Assistant Examiner

U.S. Cl. X.R.

99—445; 126—390